(12) United States Patent
Voronin et al.

(10) Patent No.: US 7,878,149 B2
(45) Date of Patent: Feb. 1, 2011

(54) METHOD AND DEVICE FOR DETECTING ESTRUS

(75) Inventors: Vladimir Voronin, Netanya (IL); Eyal Brayer, Kfaar Monash (IL); Uri Ben Menachem, Netanya (IL)

(73) Assignee: SCR Engineers Ltd., Netanya (IL)

( * ) Notice: Subject to any disclaimer, the term of this patent is extended or adjusted under 35 U.S.C. 154(b) by 216 days.

(21) Appl. No.: 11/795,574

(22) PCT Filed: Jan. 19, 2006

(86) PCT No.: PCT/IL2006/000082

§ 371 (c)(1),
(2), (4) Date: Jul. 19, 2007

(87) PCT Pub. No.: WO2006/077589

PCT Pub. Date: Jul. 27, 2006

(65) Prior Publication Data

US 2008/0110405 A1    May 15, 2008

(30) Foreign Application Priority Data

Jan. 19, 2005    (IL) ...................... 166394

(51) Int. Cl.
*A01K 29/00*    (2006.01)
*A01K 67/00*    (2006.01)
(52) U.S. Cl. ...................... 119/174; 119/712
(58) Field of Classification Search ............ 340/573.1, 340/573.2, 573.3; 600/595; 119/174, 712; *A01K 29/00, A01K 67/00*
See application file for complete search history.

(56) References Cited

U.S. PATENT DOCUMENTS

| 4,461,241 | A |   | 7/1984  | Ostler |
|-----------|---|---|---------|--------|
| 4,618,861 | A |   | 10/1986 | Getens |
| 5,005,835 | A | * | 4/1991  | Huffman ................ 473/209 |
| 5,838,432 | A | * | 11/1998 | Tokuhashi et al. ..... 356/139.03 |
| 5,916,181 | A | * | 6/1999  | Socci et al. ................ 600/595 |
| 5,923,263 | A | * | 7/1999  | Rodriguez ................ 340/689 |
| 6,049,280 | A |   | 4/2000  | Andersson |
| 6,104,294 | A |   | 8/2000  | Andersson et al. |
| 6,532,901 | B2| * | 3/2003  | Isley et al. ................ 119/712 |
| 6,583,725 | B2| * | 6/2003  | Fehrenkamp ........... 340/619 |
| 7,215,991 | B2| * | 5/2007  | Besson et al. ............ 600/509 |
| 7,335,168 | B2| * | 2/2008  | Rugg ....................... 600/595 |
| 2002/0075232 | A1| * | 6/2002 | Daum et al. ............ 345/158 |
| 2003/0205208 | A1| * | 11/2003 | Bar-Shalom ........... 119/859 |

FOREIGN PATENT DOCUMENTS

EP    0 705 536        1/1998
JP    2003219757 A *   8/2003

OTHER PUBLICATIONS

English translation of JP 2003-219757.*
International Search Report for PCT Application No. PCT/IL2006/000082. Mailing Date: Sep. 20, 2006.

* cited by examiner

*Primary Examiner*—Kimberly S Smith
*Assistant Examiner*—Marisa Conlon
(74) *Attorney, Agent, or Firm*—Pearl Cohen Zedek Latzer, LLP

(57) ABSTRACT

The present invention provides a method and device for detecting estrus in animal by sensing along time the motion of the animal and identifying when the sensed motion is not related to eating periods of the animal. Based on the sensed motion which is not related to eating periods the estrus in the animal is identified.

32 Claims, 3 Drawing Sheets ated devices that contain a motion sensor and are mounted on the animal (leg or neck). The leg mounted device count steps. This device might not give accurate information because the animal's leg is not always the most active part of the animal during estrus. In addition, mud tends to stick and harden on the device and cause discomfort and injury. Mounting the device on the leg is not easy. The neck mounted device measures general motion. The animal's neck participate in many activities such as eating, smelling and playing, so a high neck activity exists also when the animal is not in estrus. This of course makes it very difficult to detect the specific activity during estrus, and prevents neck-based sensors from acquiring accurate information.

METHOD AND DEVICE FOR DETECTING ESTRUS

CROSS-REFERENCE TO RELATED APPLICATIONS

This application is a National Phase Application of PCT International Application No. PCT/IL2006/000082, International Filing Date Jan. 19, 2006, claiming priority of Patent Application, IL166394, filed Jan. 19, 2005.

FIELD OF THE INVENTION

The present invention relates to a method and device for detecting estrus. The invention is applicable to various kinds of animals. In particular this invention is applicable to cattle animals.

BACKGROUND OF THE INVENTION

It is very common to use artificial insemination on cattle animals. Success of artificial insemination depends highly on accurate identification of the term in which an animal is in estrus. Therefore it is important to have reliable information regarding the estrus term to ensure a successful insemination resulting in pregnancy. The economic importance of the matter gives rise to many different products and methods assigned to detect estrus.

It is known that during estrus the behavior of the cattle animal changes and the over all activity rises. This high activity manifests itself by walking, running, trying to ride other animals and the like. This high activity level is clearly different from the normal activity level of cattle animals, which spends most of the time eating and ruminating. Measuring of the level of activity, that is measuring the level of movement of the body of the animal, is known in the art and may be done by one of known sensors or methods, such measuring the RMS value of a signal produced by a sensor measuring the movements of the animal.

Products for detecting estrus have been in the market for more than two decades. These products are of two types.

The first type includes simple mechanical devices. These products do not transfer the information to any central management system, and the farmer using them has to spend a lot of time in monitoring, finding and separating the cattle according to his findings. Additionally, those products are usually intended for one time use only and consequently a lot of work is involved in mounting and removing them on and from the monitored cattle animal. The reliability of those devices is generally low. For example, devices that detect if a cattle animal is trying to ride each other might help in detecting estrus. However, not all the cattle animals ride other cattle animals during estrus.

The second type includes computerized devices that contain a motion sensor and are mounted on the animal (leg or neck). The leg mounted device count steps. This device might not give accurate information because the animal's leg is not always the most active part of the animal during estrus. In addition, mud tends to stick and harden on the device and cause discomfort and injury. Mounting the device on the leg is not easy. The neck mounted device measures general motion. The animal's neck participate in many activities such as eating, smelling and playing, so a high neck activity exists also when the animal is not in estrus. This of course makes it very difficult to detect the specific activity during estrus, and prevents neck-based sensors from acquiring accurate information.

A glass cell holding electrodes and a drop of mercury is a known technology to measure activity. When motion exists the mercury covers the electrodes and causes the impedance to drop.

A metal ball that creates an electromagnetic field when changing location is also a known technology to measure activity.

Acceleration sensors based on the piezoelectric affect is another known technology to measure activity. Yet, gravity affects such sensors so that the sensor inclination affects and changes the reading.

U.S. Pat. No. 4,846,106 describes an electronic switch mounted on the cow hind and activated when another cow rides it.

U.S. Pat. No. 4,247,758 describes a device that measures and indicates the number of movements of the animal activity for detecting estrus.

U.S. Pat. No. 4,618,861 describes a device that measures activity of an animal, and uses the device's motion for its source of energy.

U.S. Pat. No. 5,111,799 describes an electronic switch attached to the cow's hind and activated when another cow mounts it.

None of these references suggests a method for detecting estrus by combining additional information of the eating periods of the animal and/or it's head inclination with information regarding the animal's motion to detect estrus.

SUMMARY OF THE INVENTION

The present invention provides a method and device for detecting estrus animals by collecting information related to the animal's motion and information related to the animal's eating periods and combining them together to reduce the impact of the animal's eating habits on the results.

The method and device of this invention have the advantage of using information regarding the animal's eating periods. This property prevents false interpretation of the gathered information indicative of animal's sensed motion, since a large portion of the animal's sensed motion occurs during eating (especially with neck mounted devices).

This invention provides a method that may comprise the steps of sensing and accumulating along time signals indicative of the motion of a cattle animal and identifying when the sensed motion is statistically not related to eating periods of said cattle animal and when it statistically deviates from the range of data indicative of normal behavior of said cattle animal. The identification of eating period of said cattle animal may assist in minimizing false interpretation of motion level deviating above the normal behavior, in order to better identify if the cattle animal is in estrus. On the other hand, identification of motion level deviating below normal behavior of said cattle animal may be indicative of the animal is sick. In order to neutralize the effect of eating periods, typically involving high level of motion, on the sensed motion the sensed data indicative of eating periods is combined with the sensed data indicative of motion. Based on the combined sensed data, changes in activity level of the said animal which is neutralized from the effect of eating activity (herein after neutralized activity or NUT-ACT) can be detected, and the animal can be identified as in estrus based on the changes in NUT-ACT level. Accumulation of said types of data may allow for statistical manipulation of the accumulated data for the identification of normal behavior and of deviations above or below this level of motion.

The detection might be done by establishing a database of typical behavior and then continuously comparing new data to the database. The comparison enables detection of changes in activity level that is typical to estrus. This database may also be continuously or periodically be updated.

This invention further provides a device comprising sensors for sensing the motion of a cattle animal and the eating periods of said cattle animal. A microprocessor may receive data of said sensed motion and of said sensed eating periods. The data may then be combined to neutralize the effect of motion associated with eating (during eating periods) on the sensed motion to get a NUT-ACT. Further, a data base of typical behavior may be established, and by comparing new collected data to the data base of typical behavior, relevant changes in activity level may be detected. The changes in activity level may be indicative that said animal is in estrus. For example, if there is a change in the activity level of more than a specified value, e.g. of a specified percentage of a calculated standard deviation of average activity level, the animal can be identified as in estrus. The analysis can strongly rely on statistical basis so the demand on the sensors' accuracy may be relaxed. Good results may be received based merely on good correlation between the sensed activity level identified as related to eating period and actual eating period. The database can be continuously updated with new collected sensed data.

The process of estrus situation detecting may be performed almost or completely entirely by the microprocessor, and notification can be sent when the animal is identified as in estrus. Alternatively, only part of the process may be performed by the microprocessor, and the processed data can be transmitted to a remote receiver, where it can be further processed to detect estrus. The estrus detection may be performed by software. An indicating means can indicate when estrus is detected.

The device may be at least partly contained within a case. The case shall preferably be placed, according to one embodiment of the invention, where the animal's head inclination and/or motion can be sensed. In other embodiments of the invention, the case may be mounted on the animal's neck using a belt. In yet another embodiment, it may be implanted inside the animal or swallowed by it. An indicating means that indicates when the animal is in estrus may be coupled to the case.

The motion sensor can be anyone of the sensors described in the prior art. The motion level can be indicated by the energy of the signal. The energy level can be deduced, for example, from the RMS value of a signal produced by a sensor.

The eating periods can be detected by measuring the animal's head inclination relative to the ground. When the animal eats, the animal's head tend to be lowered towards the ground, while usually the cattle animal tends to hold its head higher when active. While in estrus the percentage of time the animal's neck is lowered is much smaller compared with that of eating periods. A sensor may be mounted on the animal's neck or head to measure its inclination directly or by computing its value based on the measured output of the sensor. The sensed head inclination can be used to assess an eating status. A combination of high motion level and high values of head inclination may indicate with high probability that the animal is eating. Accumulation of an animal's sensed parameters and statistical methods can be used in order to identify eating periods by this method.

The eating periods can also be detected by monitoring and analyzing the sounds and vibrations that typically occur when the animal is eating. When the animal eats its jaw generates sounds and vibrations that can be monitored by a sensor on the animal or inside it and then analyzed to determine an eating activity. The animal's neck is an example for a suitable area for monitoring such sounds or vibrations.

The animal's eating status can also be assessed by monitoring its head's distance to the ground. Small distance and high motion can indicate that the animal is eating. Measuring the distance can be done using methods outlined in prior art such as ultra-sound and light.

It is possible to use a combined sensor to sense both indications of an angle of inclination of the animal's head and of motion. It is statistically expected that when the inclination sensor transmits a signal indicative of a neck of the animal being in low angle (head close to the ground) the probability of the motion represented by the motion signal, to be due to estrus is lower as well. Thus, the combined sensor may comprise internal arrangement that will attenuate the output level of the motion signal as the inclination level is higher (head closer to the ground). Accordingly, a motion signal may include inherently data of the inclination. The output of this combined sensor may than be further evaluated statistically to assess existence of estrus in the sensed animal.

Another combined sensor may be a cell partially filled with liquid and comprising a transmitter and a receiver for electromagnetic radiation, placed in two opposite sides of the cell. The transmitter may radiate electromagnetic radiation. The liquid may attenuate the radiation proportional to the amount of liquid momentarily existing between the transmitter and the receiver. The radiation may be scattered when passing out of the liquid and into the liquid, and so the radiation received by the receiver is indicative of the angle of inclination and movement of the cell. By analyzing the radiation received by the receiver a picture of accelerations and inclination along the time may be deducted.

In addition to the liquid the cell may be filled with gas or with another liquid that do not tend to mix with the first one, or with solid objects. The liquid inside the cell can be with a controllable viscosity, such as silicon, which may be suitable for the purpose of the sensor because it acts as a filter for high frequency noise and may thus enhance detection of true estrus related activity.

The radiation from the transmitters doesn't have to be continuous. The transmitter can send pulses of radiation in any desirable rate, for example a few times per second for the sake of energy conservation.

Sensed information received from a sensor sensing the motion and inclination of an animal's head may comprise two distinguishable phenomena. As the head inclination is changed slowly (typically over many seconds) while the head movement is distinguishably faster, the two components of the signal received from the sensor can be separated using an analysis phase performed by a computation unit, such as a CPU, using standard digital signal processing algorithms (for example filters). The eating periods can be detected by analyzing the DC component of the received radiation signal, and the head acceleration can be detected by analyzing the AC component of the received radiation signal.

The device may also comprise additional sensors and elements.

BRIEF DESCRIPTION OF THE FIGURES

The present invention will be understood and appreciated more fully from the following detailed description taken in conjunction with the figures in which.

Figure 1A:
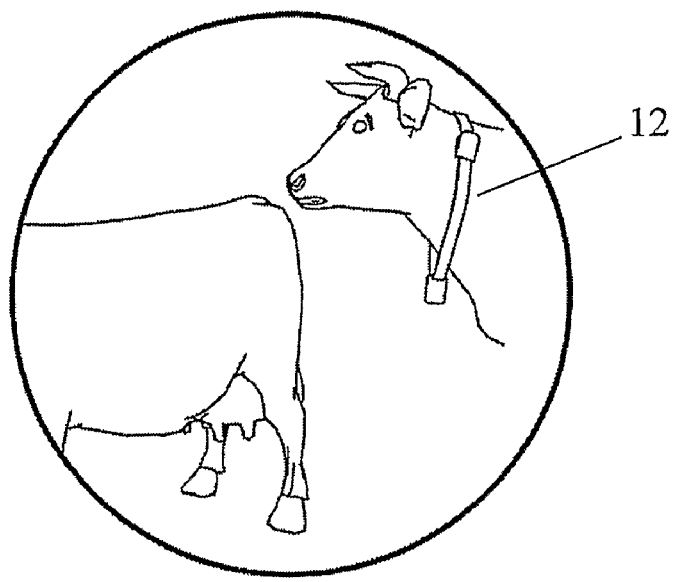
FIGS. 1A-1C are illustrations of various head inclinations of an animal.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

The method and device of this invention have the advantage of using information indicative of the animal's eating periods directly (such as noises typical of digestion) or indirectly (such as angle of inclination of the animal's neck) in combination with information indicative of the animal's level of activity, such as sensing of the animal's motion. Combining of the two types of data may dramatically enhance the probability of a signal indicative of high activity to be rightly construed as indicative of estrus if indication of the animal eating is used to mark "eating periods", which, as discussed earlier, are of very low probability to involve estrus behavior. This property prevents false interpretation of the information gathered, since a large portion of the animal's head movement occurs during eating.

Figure 1B:
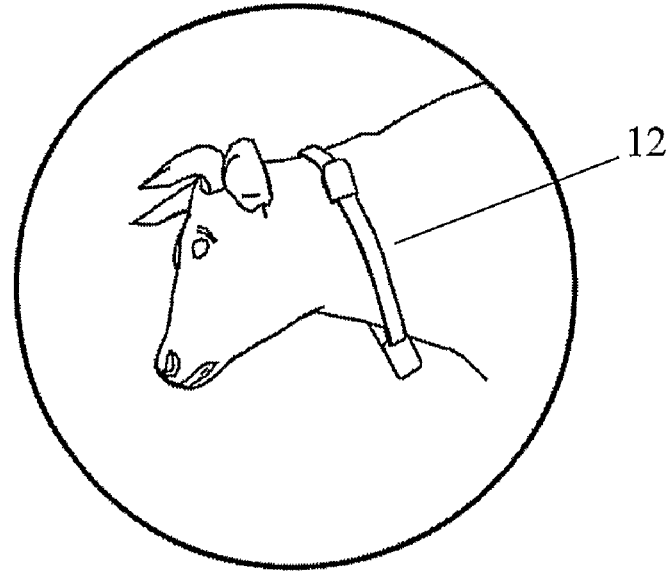
Figure 1C:
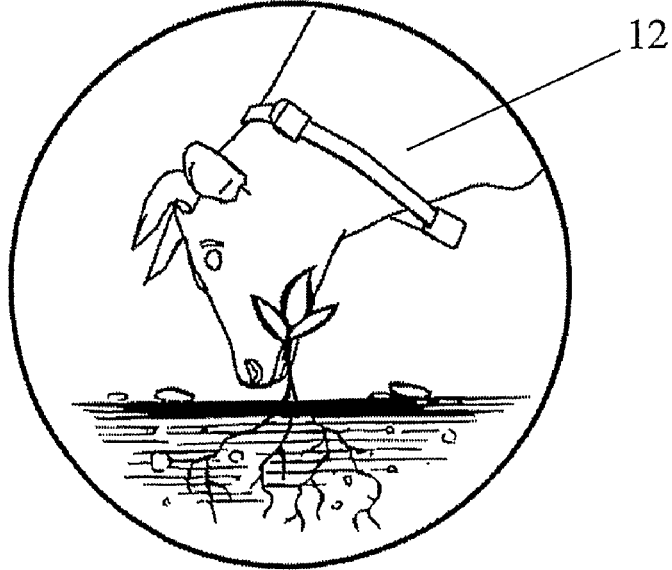

The eating periods can be detected by measuring the animal's head inclination relative to the ground. Attention is made to FIGS. 1A-1C, which are schematic illustrations of various head inclination positions of an animal in various situations. A sensor 12 may be attached to the animal so as to sense variations in the inclination of the animal's head or neck. When the animal is not busy eating the inclination may be as illustrated in FIG. 1A or 1B. When the animal is in estrus the head and neck inclination may probably be in inclination as illustrated in FIG. 1A for long periods. When the animal eats, the inclination of animal's head tend to be lowered towards the ground as illustrated in FIG. 1C. Sensor 12 can measure the inclination of the animal's head. The sensed head inclination can be used to assess whether the animal is eating. A motion sensor (not shown) may sense the level of activity of the animal. The motion sensor may be one of those described herein above, and may also be combined with inclination sensor 12. A combination of high motion level and large head inclination points to a high probability that the animal is eating. Statistical methods can be used in order to identify eating periods by this method. Two different methods may be used to interpret the inclination data. A first method may be to identify eating times by setting a predefined fixed threshold for the inclination angle signal, as received from the sensor, so that when the received inclination signal crosses this threshold it means that the movement signal should be interpreted as representing an eating period. A second method may be to monitor the sensed inclination angle over a defined period of time, for example a few days, to set an initial threshold based on these measurements and to automatically or manually set a new threshold around that value, based on the further accumulated data or on other basis. According to this method the value of NUT-ACT may be calculated as explained above and when NUT-ACT is high this may indicate an estrus type of activity.

Figure 2:
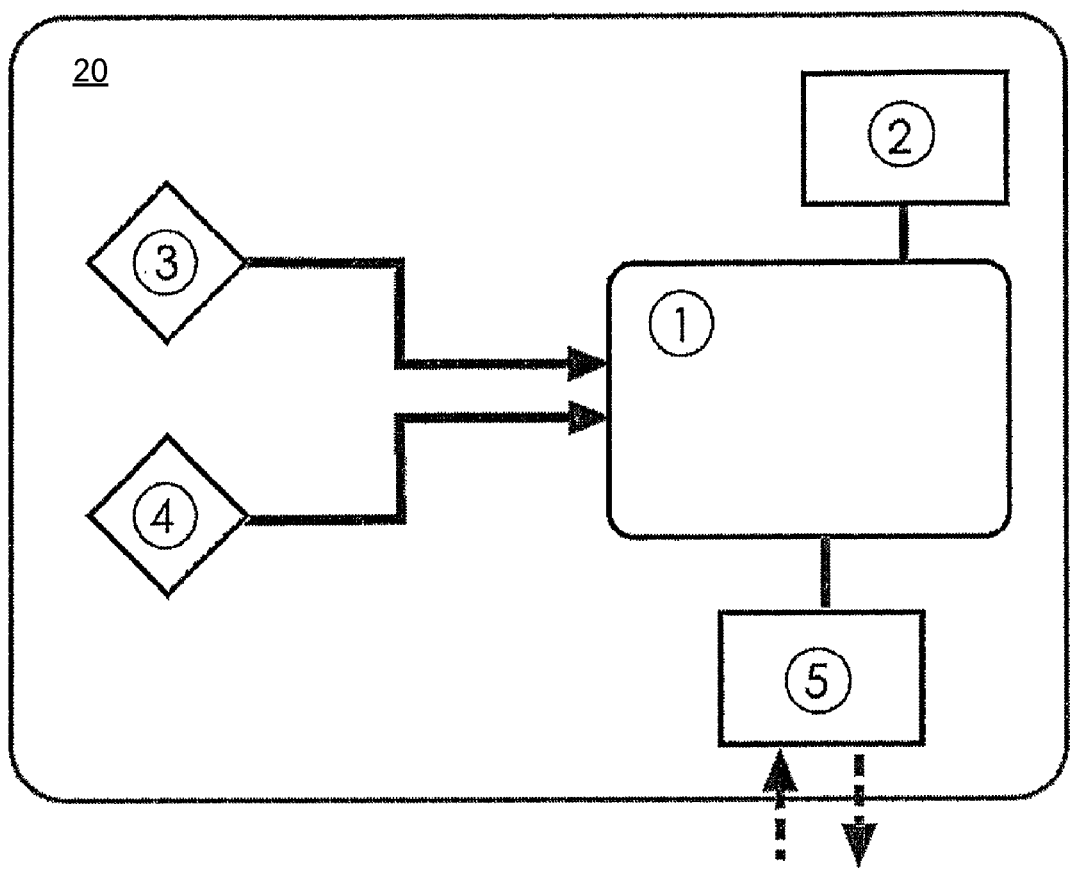
FIG. 2 is a schematic illustration of an embodiment of the device according to the invention.

Attention is made now to FIG. 2, which is a schematic block diagram illustration of an estrus identification device 20 constructed and functioning according to embodiments of the present invention. Device 20 may comprise a microprocessor 1, capable of receiving input 3 and 4 from a sensor device, a power source 2 to supply energy to device 20 and a transceiver unit 5 to transmit and receive data from and to device 20. A memory unit and a real time clock function (not shown) may be embedded in microprocessor 1. Sensor input 3 may indicate the animal's head motion and sensor input 4 may indicate the eating periods of the animal. Alternatively, it is possible to use one sensor with one output that may provide a signal composed of eating/inclination data mixed with the motion data. In such case 3 may represent combined data indicating animal's motion and eating and 4 may not be needed. The single input 3 can be further filtered by microprocessor 1 using an appropriate software or combination of software and hardware. The data processed by the microprocessor may be transmitted by transceiver unit 5, which may be a wireless transceiver. The device may be enclosed inside case 6 that may provide physical, RF, UV and the like protection to the electronics and can be mounted on the animal's body, such as on its neck.

In embodiments where sensors 3, 4 are part of case 6, case 6 can be placed anywhere on or at the animal's body as long as the animal's motion and eating status can be sensed. In some embodiments of the invention, case 6 may be mounted on the animal's neck. In other, it may be implanted inside the animal or under its skin or swallowed by it. Indicating means (not shown) that indicates when the animal is in estrus may be coupled to the case.

Microprocessor 1 may sample and collect the data received from sensors 3 and 4 into the memory. For some initial period, such as a period of a few days, the data may be used for establishing a database (not shown) of the animal's typical behavior. After the initial period, new collected data may be compared to the animal's typical behavior registered in the database. The comparison may be used by microprocessor 1 to enable detection of changes in activity level that are typical to estrus.

The data base of typical behavior may continuously be updated with new information gathered. The data analysis may comprise of algorithms that take into account the accelerations along three orthogonal axes and the eating related data along the time. This data analysis may be done continuously by processor 1 and optionally transmitted outside for further processing and action taking.

Software installed in the memory for running by microprocessor 1 may be adapted to detect estrus with a very high sensitivity and very low false alarm rate based on the eating related data and activity level combined data.

The process of estrus detecting may be performed entirely by microprocessor 1, and notification can be sent by transceiver unit 5 when the animal is identified as in estrus. Alternatively, only part of the process may be performed by microprocessor 1, and the processed data can be transmitted by transceiver unit 5 to a remote receiver, where it can be further processed to detect estrus by said remote receiver. The estrus detection may be performed by software. An indicating means can indicate when estrus is detected.

According to another embodiment of the present invention, microprocessor 1 may only be used to store the sensor's data (eating, inclination, motion . . . ) and to send it outside by transceiver unit 5 for analysis.

The microprocessor 1 might perform only preliminary analysis (for example averaging or weighting or any other algorithm that typically compress the data). The analysis results can be sent outside by transceiver unit 5 for analysis.

Alternatively, microprocessor 1 may do all that is needed in order to reach the decision whether the animal is in estrus based on the sensed data from sensors 3, 4 and typical behavior profiles stored in said memory. Such a device can indicate that the animal is in estrus by a visual indication installed on device 6, such as a lamp or any other indicating means.

Figure 3:
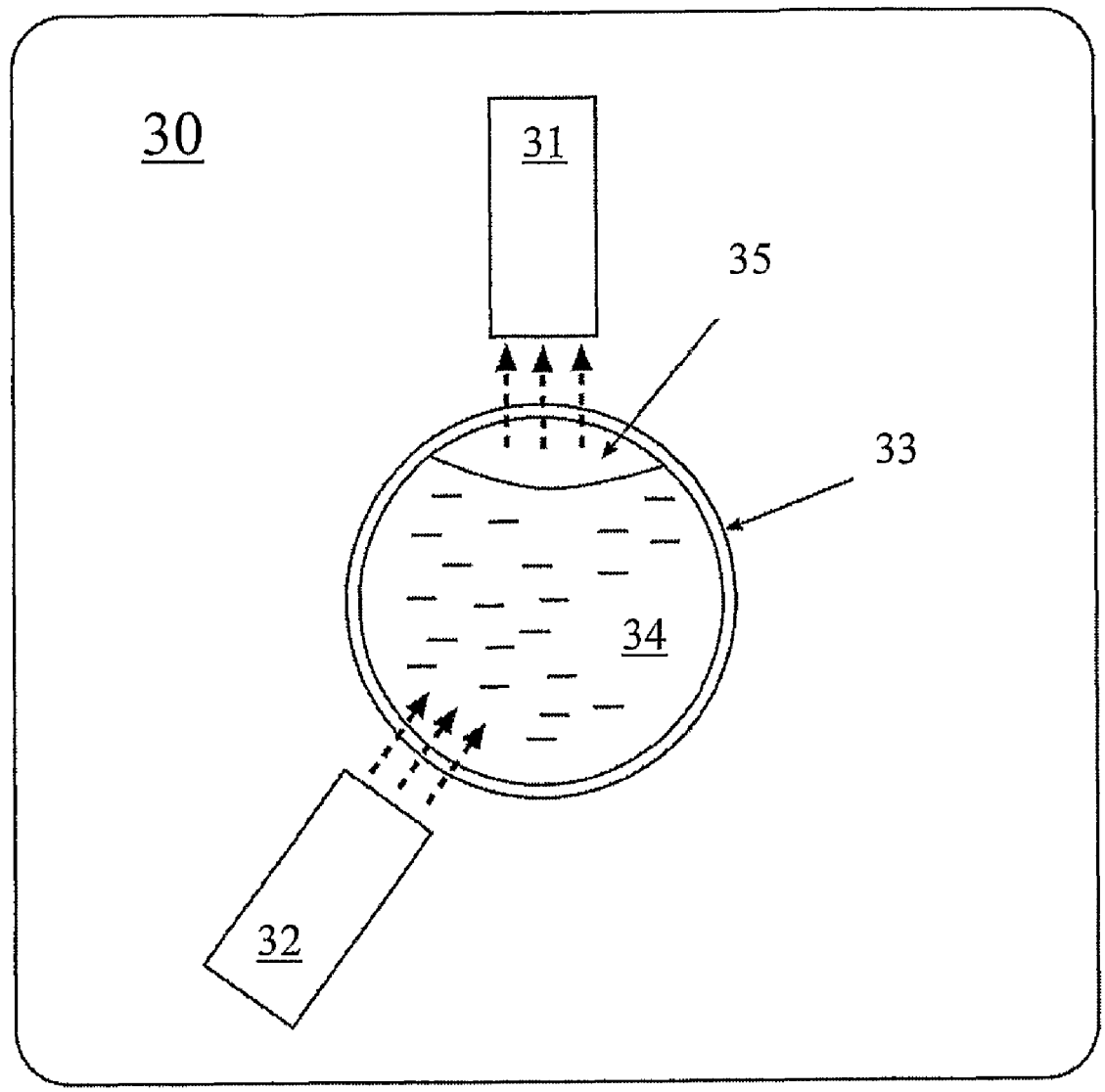
FIG. 3 is a schematic illustration of a sensor for sensing both head movement and eating periods according to some embodiments of the invention.

An embodiment of a sensor 30 for sensing both head movement and eating periods is schematically described in FIG. 3. Sensor 30 may comprise a liquid 34 trapped inside a cell 33. Liquid 34 may fill the cell only partially and a small gas 35 bubble may fill the residual internal space of cell 33. Sensor 30 may further comprise transmitter 32 and receiver 31 mounted adjacent to outside wall of cell 30 so that transmission of electromagnetic (EM) energy from transmitter 32 may travel through liquid 34 and gas bubble 35 on its way to receiver 31. When sensor 30 accelerates this bubble temporary changes it location with respect to the traveling EM energy. When the inclination of sensor 30 changes, bubble 35 also changes its location similarly. Transmitter 32 and receiver 31 of electromagnetic radiation (NIR light is very suitable) are situated on the cell sides. Cell 33 is composed of a material that allows passage of this radiation. Liquid 34 attenuates the radiation and the radiation is scattered when passing out of the liquid 4 and into the liquid 4, and so the radiation received by the receiver 31 is indicative of the angle of inclination of sensor 30 and of the movement of sensor 30. By analyzing the changes in the magnitude of radiation received by receiver 31 a picture of accelerations and inclination along the time is available.

According to another embodiment of the present invention bubble 35 may be filled with another liquid that do not tend to mix with liquid 34, or with solid objects. Liquid 34 inside the cell can be silicon, which has suitable and controllable viscosity.

The radiation from transmitter 32 doesn't have to be continuous. Transmitter 32 can send pulses of radiation a few times per second for the sake of energy conservation.

The eating periods can be detected by analyzing the DC component of the signal received by receiver 31, and the head motion can be detected by analyzing the AC component of said signal.

According to yet another embodiment of the present invention multiple transmitters 32 and receivers 31 can be used for monitoring the liquid trapped inside the cell.

According to another embodiment of the present invention one cell filled with liquid can be used for sensing motion and another sensor using different technology may be used for sensing eating related data.

According to yet another embodiment of the present invention one cell filled with liquid can be used for sensing eating related data and another sensor using different technology used for sensing motion.

According to another embodiment of the present invention, the eating status can be assessed by monitoring the distance of the head from the ground. Small distance and high motion can indicate that the animal is eating. Measuring the distance can be done using methods outlined in prior art such as ultrasound and light.

According to another embodiment of the present invention the inclination and or distance from the ground data are combined with the motion data for assessing the NUT-ACT. No explicit determination of the animal's eating state is established but rather only statistical analysis for reducing the eating periods affect is performed. Such data handling may be of larger attenuating of the motion signal as the head inclination is larger.

It will be appreciated by persons of ordinary skill in the art that according to some embodiments of the present invention other designs of estrus identifying devices with two different inputs indicative of the behavior of the animal according to the principles of the present invention are possible and are in the scope of this application.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method for detecting estrus in a cattle animal, comprising the steps of:
sensing and accumulating acceleration level of said cattle animal, over a period of time, by an acceleration sensor, wherein the acceleration level is indicated by energy level of an acceleration signal produced by the acceleration sensor;
sensing, over a period of time, data indicative of eating performed by said cattle animal;
attenuating the energy level of the acceleration signal as the indication of eating is stronger, the energy attenuated acceleration signal identifying neutralized motion data;
extracting typical activity level of said animal based on said neutralized motion data; and
identifying abnormal behavior indicative of said estrus in said animal by comparing recently identified neutralized motion data with the extracted typical activity level.

2. A method according to claim 1, further comprising establishing a database of typical behavior, wherein said data base is continuously updated.

3. A method according to claim 1, further comprising the step of transmitting to a remote receiver at least one of a list comprising the sensed motion, the information related to eating periods, the collected neutralized motion data, the extracted activity level and the identification if the animal is in estrus.

4. A method according to claim 1, further comprising a step of indicating by indication means when the animal is identified as in estrus.

5. A method according to claim 1, further comprising a step of sending notification when the animal is identified as in estrus.

6. A method according to claim 1, wherein at least one of the steps is performed inside a case which is placed where the animal's head inclination can be sensed.

7. A method according to claim 1, wherein at least one of the steps is performed inside a case which is placed where the animal's head inclination can be sensed and wherein said case is at least one of the following: mounted on the animal's neck, implanted inside the animal or swallowed by the animal.

8. A method according to claim 1, wherein the step of sensing data indicative of eating comprises a step of measuring the inclination of the animal's head relative to the ground.

9. A method according to claim 1, wherein the step of sensing data indicative of eating comprises a step of measuring the distance of the animal's head to the ground.

10. A method according to claim 1, wherein the step of sensing data indicative of eating comprises a step of monitoring and analyzing the sounds and vibrations that occur when the animal is eating.

11. A method according to claim 1, wherein the step of sensing the acceleration level comprises a step of measuring the accelerations in up to three orthogonal directions of said animal.

12. A device for detecting estrus in a cattle animal, comprising:

at least one acceleration sensor for sensing acceleration level of said cattle animal over a period of time, wherein the acceleration level is indicated by energy level of an acceleration signal produced by the acceleration sensor;

at least one sensor for sensing over a period of time, data indicative of eating performed by said cattle animal; and at least one microprocessor for accumulating said acceleration signal, attenuating the energy level of the acceleration signal as the indication of eating is stronger, the energy attenuated acceleration signal identifying neutralized motion data, extracting typical activity level of said animal based on said neutralized motion data and identifying abnormal behavior indicative of said estrus in said animal by comparing recently identified neutralized motion data with the extracted typical activity level.

13. A device according to claim 12, said microprocessor further comprising a memory.

14. A device according to claim 12, said microprocessor further comprising a real time clock.

15. A device according to claim 12, further comprising a transceiver unit to transmit data processed by said microprocessor to a remote receiver.

16. A device according to claim 15, wherein said transceiver unit is adapted to send notification when the animal is identified as in estrus.

17. A device according to claim 12, further comprising an indicating means which indicates when the animal is identified as in estrus.

18. A device according to claim 12, wherein the device is at least partly contained within a case which is placed where the animal's head inclination can be sensed.

19. A device according to claim 18, wherein said case is at least one of the following: mounted on the animal's neck, implanted inside the animal or swallowed by the animal.

20. A device according to claim 12, wherein said sensor for sensing data indicative of eating is adapted to measure the animal's head inclination relative to the ground.

21. A device according to claim 12, wherein said sensor for sensing data indicative of eating is adapted to measure the distance of the animal's head to the ground.

22. A device according to claim 12, wherein said sensor for sensing data indicative of eating is adapted to monitor and analyze the sounds and vibrations that occur when said animal is eating.

23. A device according to claim 12, wherein said sensor for sensing the motion is adapted to measure the accelerations in up to three orthogonal directions.

24. A device according to claim 12, comprising a combined sensor comprising said at least one sensor for sensing the motion and said at least one sensor for sensing data indicative of eating.

25. A device according to claim 24, wherein said combined sensor reports head motion values inversely proportional to the head's inclination angle.

26. A device according to claim 24, wherein said combined sensor comprises:
a cell partially filled with a first type of liquid comprising:
at least one transmitter and at least one receiver of electromagnetic radiation, the radiation received by said at least one receiver is indicative of an angle of inclination of said cell.

27. A device according to claim 26, wherein said electromagnetic radiation is substantially in the near infrared light (NIR light) range.

28. A device according to claim 26, wherein said microprocessor is adapted to identify the eating periods by analyzing a DC component of the received radiation signal, and sensing of the motion is done by analyzing an AC component of the received radiation signal.

29. A device according to claim 26, wherein said cell is further filled with gas.

30. A device according to claim 26, wherein said cell is further filled with a second type of liquid that does not tend to mix with said first type.

31. A device according to claim 26, wherein said cell is further filled with at least one solid object.

32. A device according to claim 26, wherein said first type of liquid is silicon.

* * * * *